(12) United States Patent
Szigeti et al.

(10) Patent No.: US 12,204,659 B2
(45) Date of Patent: Jan. 21, 2025

(54) DYNAMIC SECURITY POLICY FOR SHARING CONTENT IN COLLABORATIVE APPLICATIONS

(71) Applicant: Cisco Technology, Inc., San Jose, CA (US)

(72) Inventors: Thomas Szigeti, Vancouver (CA); Robert E. Barton, Richmond (CA); Jerome Henry, Pittsboro, NC (US); Brian C. Powell, El Segundo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 339 days.

(21) Appl. No.: 17/673,193

(22) Filed: Feb. 16, 2022

(65) Prior Publication Data
US 2023/0259643 A1    Aug. 17, 2023

(51) Int. Cl.
*G06F 21/60* (2013.01)
*G06F 21/62* (2013.01)
*G06K 19/06* (2006.01)

(52) U.S. Cl.
CPC .......... *G06F 21/604* (2013.01); *G06F 21/62* (2013.01); *G06K 19/06037* (2013.01)

(58) Field of Classification Search
CPC .... G06F 21/604; G06F 21/62; G06F 21/6218; G06F 2221/2111; G06K 19/06037
See application file for complete search history.

(56) References Cited

U.S. PATENT DOCUMENTS

| | | |
|---|---|---|
| 5,778,398 A | 7/1998 | Nagashima et al. |
| 8,544,060 B1 | 9/2013 | Khetawat |
| 9,237,170 B2 | 1/2016 | Kiang et al. |
| 9,300,693 B1 | 3/2016 | Manmohan et al. |
| 9,311,499 B2 | 4/2016 | Redlich et al. |
| 9,363,293 B2 | 6/2016 | Das et al. |
| 10,079,835 B1 | 9/2018 | Dodke et al. |
| 10,348,783 B2 | 7/2019 | Kowal et al. |
| 10,887,669 B2 | 1/2021 | Deshpande |
| 10,936,739 B1 | 3/2021 | Lim et al. |

(Continued)

OTHER PUBLICATIONS

Frédéric Dufaux et al., "Privacy Enabling Technology for Video Surveillance", https://infoscience.epfl.ch/record/91037/files/Dufaux2006_1542.pdf, downloaded Dec. 21, 2018, 12 pages.

(Continued)

*Primary Examiner* — Theodore C Parsons
(74) *Attorney, Agent, or Firm* — Edell, Shapiro & Finnan, LLC

(57) ABSTRACT

A method, computer system, and computer program product are provided for applying a dynamic security policy to shared content in collaborative applications. A selection of one or more content items is received for sharing in a communication session. A security policy is queried using a key that is associated with each of the one or more content items to determine a security policy for each of the one or more content items. A plurality of users participating in the communication session are identified. Each content item of the one or more content items is selectively presented to a subset of the plurality of users based on an identity of a respective user and the security policy of each content item.

20 Claims, 11 Drawing Sheets

(56) References Cited

U.S. PATENT DOCUMENTS

| | | | |
|---|---|---|---|
| 11,790,107 B1* | 10/2023 | Jain | H04L 63/102 726/4 |
| 2007/0294173 A1 | 12/2007 | Levy et al. | |
| 2008/0163364 A1 | 7/2008 | Ferlitsch | |
| 2009/0178144 A1* | 7/2009 | Redlich | G06F 21/6209 726/27 |
| 2010/0268740 A1 | 10/2010 | Barker et al. | |
| 2014/0047560 A1* | 2/2014 | Meyer | G06F 21/62 726/28 |
| 2014/0117073 A1 | 5/2014 | Bell | |
| 2016/0117517 A1 | 4/2016 | Li et al. | |
| 2016/0140681 A1 | 5/2016 | Ramos | |
| 2016/0155112 A1* | 6/2016 | Phillips | G06Q 20/3276 235/379 |
| 2017/0118271 A1 | 4/2017 | Reyes | |
| 2017/0262159 A1 | 9/2017 | Denoue et al. | |
| 2020/0019716 A1 | 1/2020 | Leonard et al. | |
| 2020/0342131 A1 | 10/2020 | Giralt | |
| 2021/0058439 A1 | 2/2021 | Yuan | |
| 2021/0226995 A1 | 7/2021 | Lear et al. | |
| 2022/0247736 A1* | 8/2022 | Tafazoli Bilandi | G06F 21/1064 |
| 2023/0123453 A1* | 4/2023 | Swanson | G09F 1/04 358/1.13 |

OTHER PUBLICATIONS

Personify, "FAQs—ChromaCam," Feb. 19, 2019, 13 pages.
Randy Devlin, "Data Loss Prevention," GIAC (GSEC) Gold Certification, Sep. 6, 2015, 30 pages.
Tribhuvanesh Orekondy et al., "Connecting Pixels to Privacy and Utility: Automatic Redaction of Private Information in Images," arXiv:1712.01066v1 [cs.CV], Dec. 4, 2017, 21 pages.
Personify, "ChromaCam," https://personifyinc.com/products/chromacam, downloaded Mar. 1, 2019, 5 pages.
IMATAG, "IMATAG Introduction," retrieved from https://d2i0awu7puyonj.cloudfront.net/3/101789/d8a4d1d2-ec61-41f2-8e6f-21fcd9db3488.pdf, on Dec. 21, 2021, 10 pages.
Nainar, et al., "Policy and Metadata Controlled Meeting Granular Content Visibility and Access for Remote Participants," An IP.com Prior Art Database Technical Disclosure, IP.com No. IPCOM000253181D, Mar. 12, 2018, 5 pages.
Chow, et al., "A QR Code Watermarking Approach based on the DWT-DCT Technique," Conference Paper in Lecture Notes in Computer Science, Australasian Conference on Information Security and Privacy, May 2017, 20 pages.
Vongpradhip, et al., "QR Code Using Invisible Watermarking in Frequency Domain," 2011 Ninth International Conference on ICT and Knowledge Engineering, Jan. 2012, 6 pages.
Harichandra Babu, et al., "Enhancing Web Conferencing Privacy Protection", Technical Disclosure Commons, https://www.tdcommons.org/dpubs_series/4570, Sep. 2, 2021, 13 pages.
Simply Unique, "Invisible Barcode Could Revolutionise Packaging Market," https://www.interpack.com/en/Discover/TIGHTLY_PACKED_Magazine/FOOD_INDUSTRY_PACKAGING/News/Invisible_barcode_could_revolutionise_packaging_market, retrieved Mar. 10, 2022, 5 pages.
Kuan et al., "Visible Graphic QR Code With Embedded Invisible QR Code to Enhance Anti-Counterfeiting Features," Proceedings of 132nd IASTEM International Conference, Aug. 2018, 6 pages.
Nishane, et al., "Digital Image Watermarking based on DWT using QR Code," International Journal of Current Engineering and Technology, vol. 5, No. 3, Jun. 2015, 3 pages.

* cited by examiner

DYNAMIC SECURITY POLICY FOR SHARING CONTENT IN COLLABORATIVE APPLICATIONS

TECHNICAL FIELD

The present disclosure relates to computing security and information technology, and more specifically, to a dynamic security policy for sharing content.

BACKGROUND

In the field of computing security and information technology, large enterprises can produce an immense quantity of confidential or otherwise sensitive content that can be difficult to control and/or track. Conventional approaches typically assign levels of confidentiality to documents (e.g., "confidential," "highly confidential," etc.), which can be limiting due to the coarse granularity offered by such document-level approaches. Additionally, due to the increase in popularity of collaborative meeting sessions (e.g., video conferencing), there is an increased risk of leaking sensitive data to remote participants. For example, a slideshow containing sensitive data may be presented to remote participants who are in attendance, but who may not actually be authorized to view some of the content in the presentation. Accordingly, it is desirable to provide a dynamic, highly granular security policy that can be applied to content shared during collaborative sessions.

DESCRIPTION OF EXAMPLE EMBODIMENTS

Overview

Figure 1:
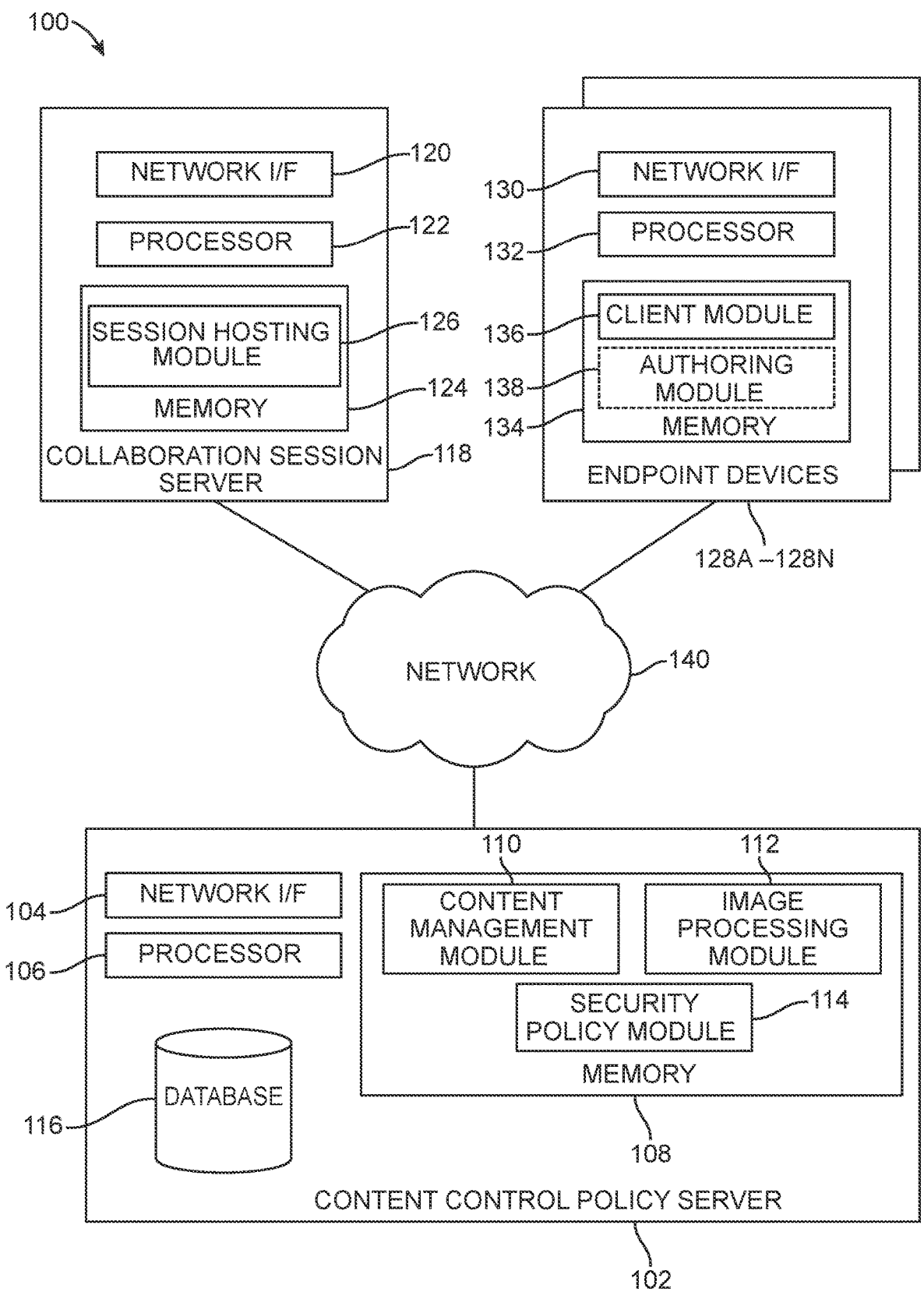
FIG. 1 is a block diagram depicting an environment for applying a dynamic security policy to shared content in collaborative applications, in accordance with an example embodiment.

According to one embodiment, techniques are provided for applying a dynamic security policy to shared content in collaborative applications. A selection of one or more content items is received for sharing in a communication session. A security policy is queried using a key that is associated with each of the one or more content items to determine a security policy for each of the one or more content items. A plurality of users participating in the communication session are identified. Each content item of the one or more content items is selectively presented to a subset of the plurality of users based on an identity of a respective user and the security policy of each content item.

Example Embodiments

Embodiments are provided for controlling access to data, and more specifically, to a dynamic security policy that is applied to content shared in collaborative applications.

In the field of computing security and information technology, organizations may employ a variety of approaches to securing data. Typically, data is secured in a manner such that only authorized users may retrieve the data from a storage location. Conventional approaches to securing data can fail when the data is shared via collaborative applications (e.g., during a video conferencing session). For example, conventional security restrictions on accessing data may fail to prevent the data from being exposed to participants in a video conference, as the data is presented through a presenter's shared screen.

Accordingly, present embodiments provide a content control policy in which content items in documents can be managed at any level of granularity to prevent unauthorized access to those content items, track usage of the content items, and to provide a flexible security policy that can be updated to modify access permissions for all resulting copies of particular content items. In particular, a content item can be tagged with a key that associates the content item with a defined security policy having attributes that can be provided by the author of the content item or another user. The key may remain associated with a content item when the content item is copied, thereby providing downstream control of content. Furthermore, a server that hosts a collaborative application session may detect keys of content items that a user desires to share during the session, and selectively share each content item with other participants based on their permissions and/or other factors.

Thus, present embodiments provide a practical application of providing a dynamic security policy that can control access to content, including content being shared in communication sessions as well as any existing copies of content that have been made by other users and/or inserted into other documents. Accordingly, present embodiments provide technical improvements to the fields of computing security and information technology by providing a content-based security policy that can secure shared copies of content items, including content items that are shared via collaboration applications.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for applying a dynamic security policy to shared content in collaborative applications, in accordance with an example embodiment. As depicted, environment 100 includes a content control policy server 102, a collaboration session server 118, endpoint devices 128A-128N, and a (communication) network 140. It is to be understood that the functional division among components of environment 100 have been chosen for purposes of explaining various embodiments and is not to be construed as a limiting example. In general, content control policy server 102 manages and enforces security policies for content items, which can be shared in collaboration sessions that are hosted by collaboration session server 118 and conducted between endpoint devices 128A-128N.

Content control policy server 102 includes a network interface (I/F) 104, at least one processor 106, memory 108, and a database 116. Memory 108 stores software instructions for a content management module 110, an image processing module 112, and a security policy module 114. Network interface 104 may include one or more network interface cards, line cards, etc., and enables components of content control policy server 102 to send and receive data over a network, such as network 140. In general, content control policy server 102 enables a content author or other user to register content items with a central database (e.g., database 116) in which the content items can be associated with security policies. Additionally or alternatively, content control policy server 102 enforces security policies with regard to content items. Content control policy server 102 may include internal and external hardware components, as depicted and described in further detail with respect to FIG. 9.

Content management module 110, image processing module 112, and security policy module 114 may include one or more modules or units to perform various functions of the embodiments described below. Content management module 110, image processing module 112, and security policy module 114 may be implemented by any combination of any quantity of software and/or hardware modules or units, and may reside within memory 108 of content control policy server 102 for execution by a processor, such as processor 106.

Content management module 110 enables content items to be managed and associated with particular security policy attributes in accordance with present embodiments. In particular, content management module 110 may receive content control policy details for a particular content item from the content author or another user, and may store those details along with a key that can be returned to the author or other user, whereupon the key can be in associated with the content item. In some embodiments, content management module 110 receives and stores data corresponding to a content item itself. However, in other embodiments, content management module 110 may merely manage associations between keys and security policy attributes for content items.

A user, such as a content author, may provide content management module 110 with instructions to update a preexisting security policy for a content item. Any security policy attributes may be modified at any time to accordingly modify the enforcement of a security policy for any copies of a particular content item. For example, specific authorized users may be added or removed, the security level required to access a content item may be raised or lowered, the locations at which access is permitted may be modified (e.g., network locations and/or physical locations of endpoint devices), date and/or time restrictions can be added, removed, or modified, and the like.

The key that content management module 110 assigns to a security policy of a content item may include a particular value that is either computed or predetermined. In some embodiments, content management module 110 may assign key in a consecutive order; for example, each key may be a numerical value, hexadecimal value, alphanumeric value, etc., that is iterated in some manner at each assigning of a new key. In some embodiments, key values may be based on specific database entries, such as a column and row of a database at which security policy details are stored. In other embodiments, the values for keys may be randomly or pseudo-randomly assigned, e.g., as a random string of text, selection of random adjective-adjective-noun combination, etc. In some embodiments, content management module 110 may generate a graphical indicator, such as a two-dimensional barcode, that encodes a key value, and may return the graphical indicator to a requesting endpoint device rather than a key value itself.

Image processing module 112 employs one or more image processing techniques in order to identify graphical indicators that are associated with keys and that have been inserted into content items. Image processing module 112 may analyze images of content items that a user has requested to share during a collaborative meeting session. By analyzing images of the content items, image processing module 112 may extract key values that can be used to retrieve the security policy details for each content item.

In some embodiments, one or more graphical indicators are inserted into a content item in a manner that is machine-detectable but not visible to the human eye. For example, a two-dimensional barcode may be inserted into a content item by matching the color of the barcode to be close, but not exactly the same as, the color of the content item. For example, a two-dimensional barcode can be inserted into a content item by overlaying the barcode as a watermark that is only one shade value lighter or darker than the pixels of the content item that the barcode overlays. As another example, if a content item has a white space whose hexadecimal color code is "#FFFFFF," a two-dimensional barcode can be inserted into the white space by selecting a color code of "#FFFFFE", "#FEFFFF," "#FFFEFF," etc., for the barcode. Accordingly, in some embodiments, image processing module 112 may process pixel image values to detect the presence of graphical indicators that contain key values.

In some embodiments, image processing module 112 may use a trained machine learning model to identify graphical indicators in content items. In particular, a machine learning algorithm, such as a pattern recognition model, a deep learning model (e.g., a deep neural network, a convolutional neural network, and the like, may be trained to identify and extract graphical indicators from content items. The use of machine learning to extract graphical indicators is depicted and discussed in further detail with regard to FIG. 8. In some embodiments, key values are inserted into content items as metadata. Additionally or alternatively, key values can be inserted into content items using steganographic-based approaches (e.g., hiding data.

Security policy module 114 enforces security polices of content items by using the key values retrieved from content items to retrieve the security policy details for content items, and selectively permitting or denying access based on the security policy details. In some embodiments, security policy module 114 enforces security policies on a content item-by-content item basis for each content item that a user has requested to share during a collaboration session. Initially, security policy module 114 may receive input that includes a selection of content items keys, the identities of users participating in a collaboration session, and/or other contextual details, including time and/or date, physical location and/or network location of each participant, and the like. Security policy module 114 may use key values of content items to retrieve the security policy details, which can compared to the identities of users and/or the other contextual details to identify a subset of users authorized to view each content item. Accordingly, security policy module 114 can implement dynamic security policies by using a content item's key to retrieve the current (i.e. most up-to-date) security policy for content items. Additionally, security policy module 114 can determine whether each user can view a particular content item, thus enabling a mixed presentation that includes various content items to be presented in a manner that selectively permits or denies participants access to particular content items throughout the presentation. Accordingly, security policy module 114 may determine a subset of users that are authorized to view each content item in a collaborative session, and may transmit instructions to collaboration session server 118 to cause data corresponding to each content item to be selectively transmitted to the endpoint devices 128A-128N of authorized participants during a collaboration session.

Database 116 may include any non-volatile storage media known in the art. For example, database 116 can be implemented with a tape library, optical library, one or more independent hard disk drives, or multiple hard disk drives in a redundant array of independent disks (RAID). Similarly, data in database 116 may conform to any suitable storage architecture known in the art, such as a file, a relational database, an object-oriented database, and/or one or more tables. Database 116 may store associations between key values for content items and corresponding security policy attributes for those content items. In some embodiments, database 116 may store data corresponding to content items themselves. Additionally or alternatively, database 116 may store user identities and corresponding security levels (e.g., groups of users for each defined security level of access).

Collaboration session server 118 includes a network interface (I/F) 120, at least one processor 122, and memory 124, which stores software instructions for session hosting module 126. Collaboration session server 118 may include, for example, a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 120 may include one or more network interface cards, line cards, etc., and enables components of collaboration session server 118 to send and receive data over a network, such as network 140. In general, collaboration session server 118 hosts collaboration sessions in which content items may be shared in accordance with present embodiments. Collaboration session server 118 may include internal and external hardware components, as depicted and described in further detail with respect to FIG. 9.

In some embodiments, one or more functions of collaboration session server 118 and/or session hosting module 126 are performed at, or combined with, functions of content control policy server 102, including functions performed by content management module 110, image processing module 112, and/or security policy module 114. Accordingly, while the embodiment depicted in environment 100 of FIG. 1 depicts content control policy server 102 and collaboration session server 18 as separate entities, it should be appreciated that in some embodiments, the functionality may be combined as desired in order to perform various security policy analysis and/or enforcement operations by a same computing system that performs collaboration session hosting operations.

Session hosting module 126 may include one or more modules or units to perform various functions of the embodiments described below. Session hosting module 126 may be implemented by any combination of any quantity of software and/or hardware modules or units, and may reside within memory 124 of collaboration session server 118 for execution by a processor, such as processor 122.

Session hosting module 126 may initiate collaboration sessions (e.g., video conferences, etc.) between participants so that one or more users can share data, including video data, audio data, and/or data corresponding to content items, with the other participants. Session hosting module 126 may communicate with security policy module 114 of content control policy server 102 to provide security policy module 114 with data including content items and/or key values of content items, identities of users participating in a given current or scheduled collaboration session, other contextual details (e.g., locations of users, time and date), and any other data that is relevant for enforcing security policies for content items in accordance with present embodiments. Additionally or alternatively, session hosting module 126 may perform any operations related to the hosting of collaboration sessions, including transmitting data between participants, arranging for the exchange of data between participants (e.g., in a peer-to-peer approach), initiating collaboration sessions, inviting users to collaboration sessions, permitting or denying users access to a communication session, and the like.

Endpoint devices 128A-128N may each include a network interface (I/F) 130, at least one processor 132, and memory 134. Memory 108 stores software instructions for a client module 136 and optionally, an authoring module 138. Endpoint devices 128A-128N may include, for example, a laptop computer, a tablet computer, a netbook computer, a personal computer (PC), a desktop computer, a personal digital assistant (PDA), a smart phone, a thin client, or any programmable electronic device capable of executing computer readable program instructions. Network interface 130 may include one or more network interface cards, line cards, etc., and enables components of each endpoint devices 128A-128N to send and receive data over a network, such as network 140. In general, endpoint devices 128A-128N may enable users to participate in collaboration sessions and/or author content (including defining security policy details for authored content). Endpoint devices 128A-128N may include internal and external hardware components, as depicted and described in further detail below with respect to FIG. 9.

Endpoint devices 128A-128N may include one or more modules or units to perform various functions of the embodiments described below. Endpoint devices 128A-128N may be implemented by any combination of any quantity of software and/or hardware modules or units, and may reside within memory 134 of any of endpoint devices 128A-128N for execution by a processor, such as processor 132.

Client module 136 may include a client for initiating and/or participating in collaboration sessions (e.g., sessions hosted by session hosting module 126). As such, client module 136 may utilize any known or other communication protocols to exchange data between endpoint devices 128A-128N during a collaboration session, including audio data, video data, text data, content item data, and/or other data. Client module 136 may obtain an identity of a user of each endpoint device 128A-128N in order to provide content control policy server 102 and/or collaboration session server 118 with the identities of participants in order to support the practice of embodiments presented herein. In some embodiments, client module 136 may collect contextual data relating to endpoint devices 128A-128N or other data, such as the network location of a device (e.g., an indication of whether the device is connected from an enterprise's secure internal network, connected via a virtual private network (VPN), or connected via a public network, etc.), the geographical location of a device, and/or the time and/or date.

Authoring module 138 enables a user of an endpoint device, such as endpoint device 128A, to author content that can be shared subject a content control policy in accordance with present embodiments. Authoring module 138 may include a plug-in that is provided to an editor such as a word processing application, slideshow presentation application, image processing application, and the like. Authoring module 138 may only be necessary for a content author or other user who is tasked with defining security policies, so a security policy can be applied without the need for each endpoint device 128A-128N to have specialized software.

Authoring module 138 enables a user to define a security policy for content items created by the user or by another user; in particular, authoring module 138 enables a user to provide attributes for a security policy, such as the identities of particular users and/or user groups who are authorized or unauthorized to view content items, any context-based access restrictions (e.g., preventing users from viewing content from a particular network and/or geographical location), and time or date restrictions (e.g. preventing users from viewing content at particular times or dates).

Any combination of attributes may be defined for a security policy; for example, a first group of users may only be authorized to view content from a particular location at a particular day, whereas a specified one or more other users may be permitted to access content unconditionally, etc. In some embodiments, some or all features of a security policy may expire or otherwise be modified after a defined date and/or time. For example, a user may define a content item as highly confidential prior to a scheduled press release, whereupon the content item's security level may be lowered, or the content item may become publically-accessible. Similarly, different security policies can be defined for different spans of time.

Network 140 may include a local area network (LAN), a wide area network (WAN) such as the Internet, or a combination of the two, and includes wired, wireless, or fiber optic connections. In general, network 140 can be any combination of connections and protocols known in the art that will support communications between content control policy server 102, collaboration session server 118, and/or endpoint devices 128A-128N via their respective network interfaces in accordance with the described embodiments.

Figure 2A:
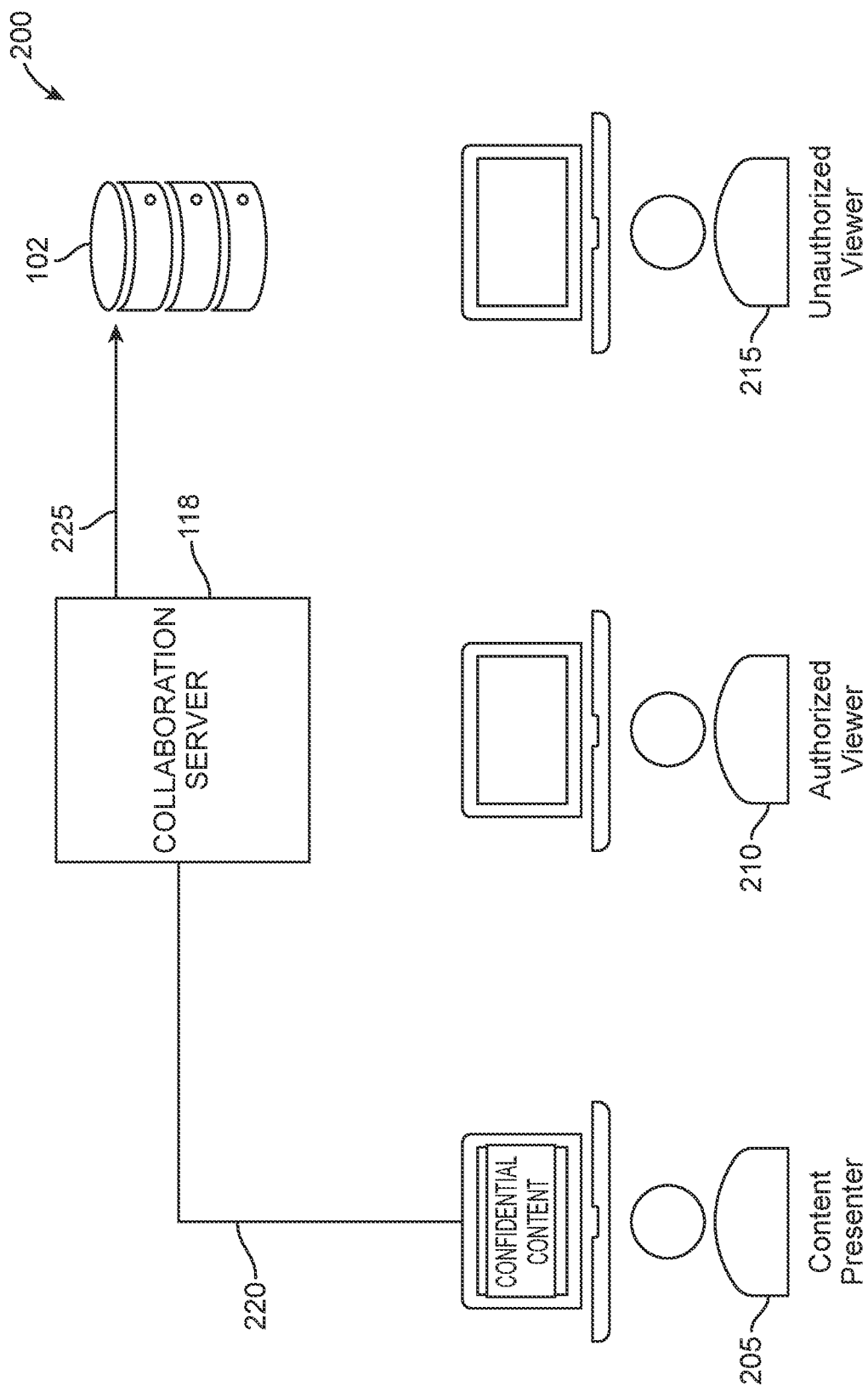
FIGS. 2A-2C are diagrams depicting a workflow in which content is shared via a collaboration application, in accordance with an example embodiment.
Figure 2B:
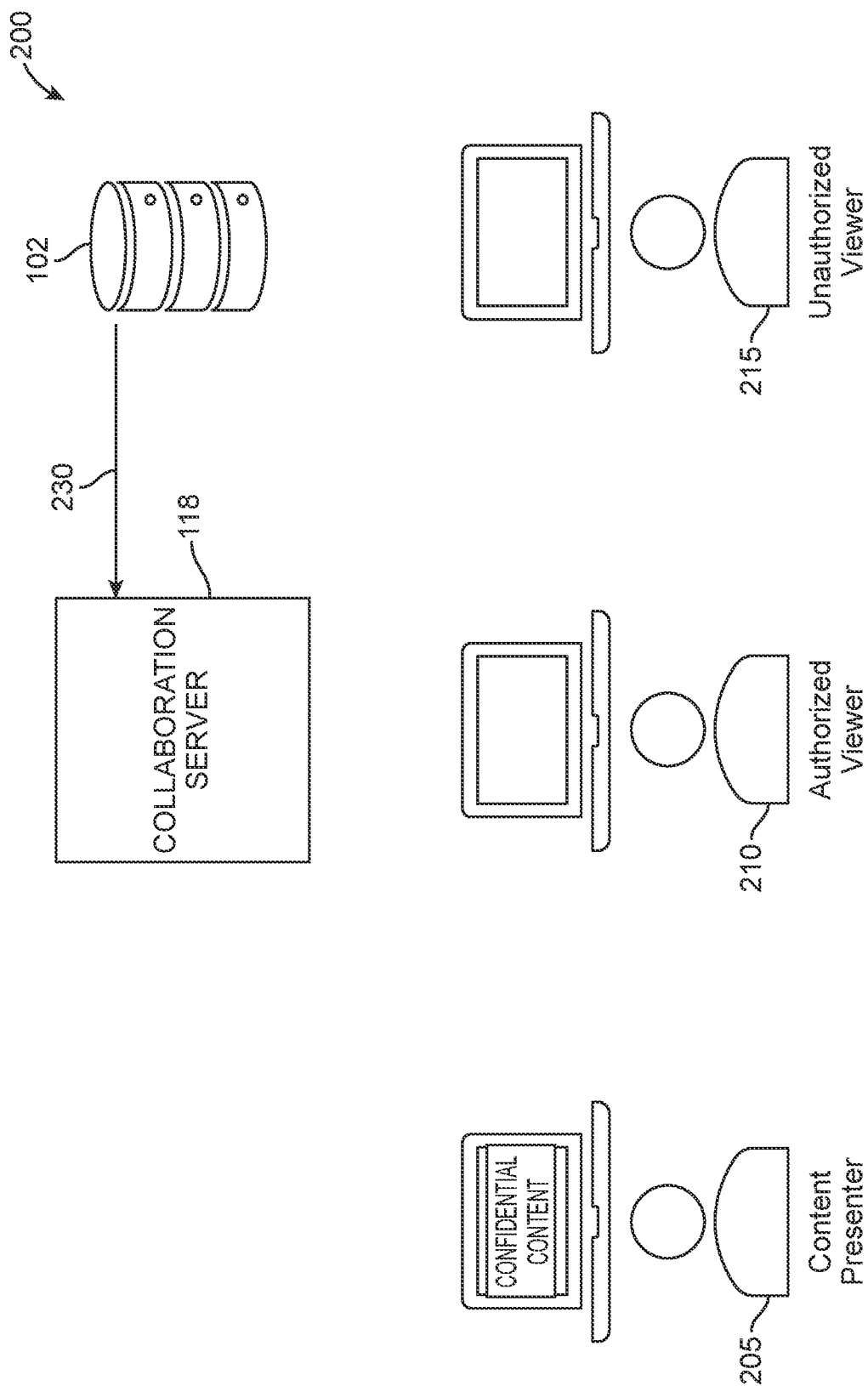
Figure 2C:
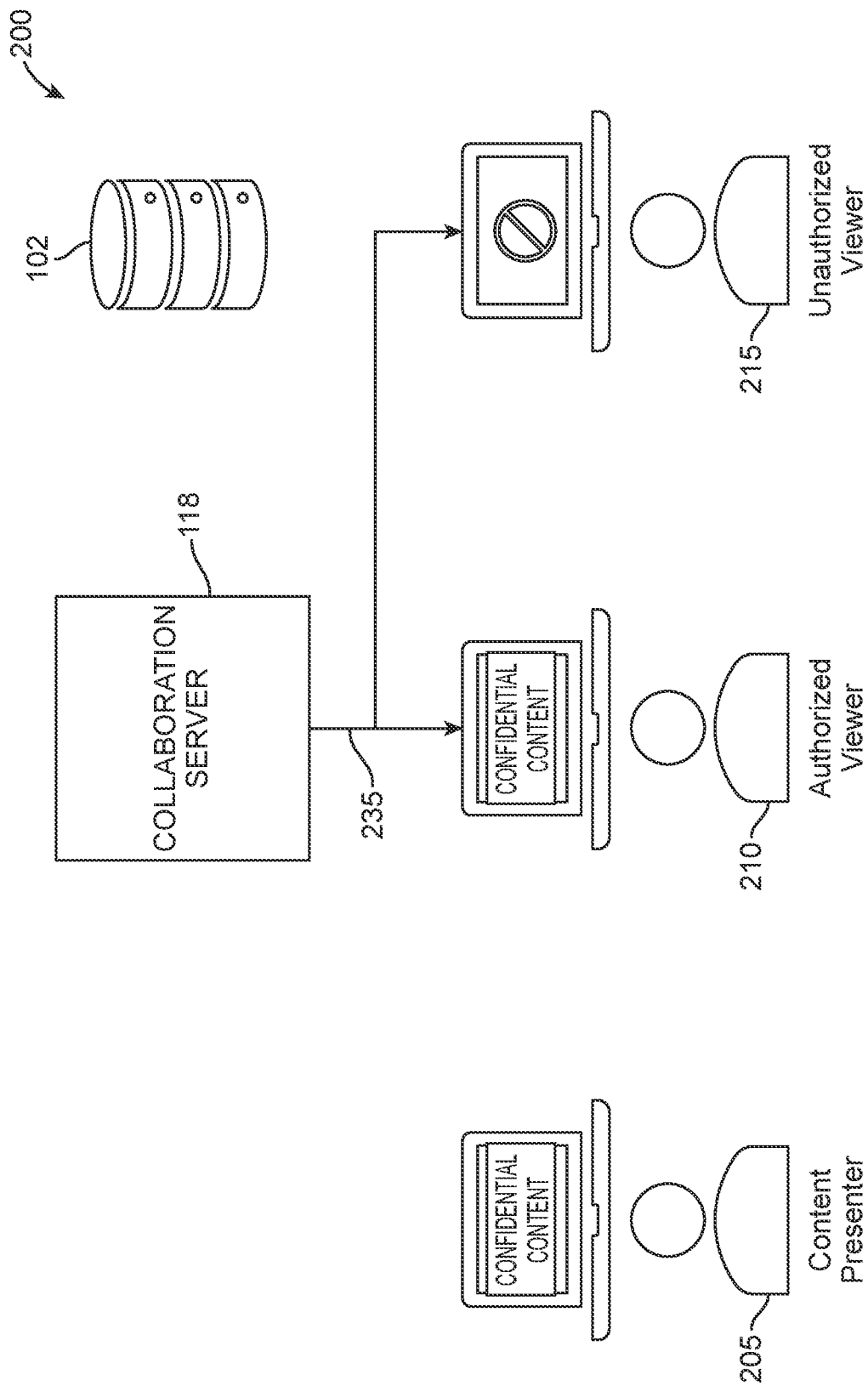

Reference is now made to FIGS. 2A-2C. FIGS. 2A-2C are diagrams depicting a workflow 200 in which content is shared via a collaboration application, in accordance with an example embodiment.

As shown in FIG. 2A, workflow 200 includes a content presenter 205, an authorized viewer 210, and an unauthorized viewer 215. During a collaborative content sharing session, content presenter 205 may select content to share that includes one or more content items to share with the other participants (e.g., authorized viewer 210 and unauthorized viewer 215). The content may initially be provided to a server hosting the collaborative content sharing session (e.g., collaboration session server 118), as indicated by arrow 220.

In response to the server receiving content that content presenter 205 is requesting to be shared with the other participants, the server may provide the content to a content control policy server (e.g., content control policy server 102) in order to receive instructions regarding how to enforce a security policy for the content, as indicated by arrow 225. Alternatively, the content control policy server may extract keys from each content item and provide those keys to the content control policy server.

FIG. 2B depicts workflow 200 at a point in time after the content control policy server (e.g., content control policy server 102) has received the content or keys. The content control policy server may extract keys from the content, if not provided with keys directly, and use each key value to consult a database (e.g., database 116) in which a security policy detailing access conditions for each content item may be retrieved. The access conditions may indicate specific users, user groups, user device locations, times and dates, and the like, under which each content item may be accessed. Based on the identities of the participants in the collaboration session (e.g., authorized viewer 210 and unauthorized viewer 215), the content control policy server may respond to the session hosting server (e.g., collaboration session server 118) with instructions detailing the users who are authorized to view each content item, as indicated by arrow 230.

Now with reference to FIG. 2C, workflow 200 is shown after the session hosting server (e.g., collaboration session server 118) has received instructions indicating who may or may not view particular content items. When a particular content item is presented to the participants, as indicated by arrow 235, the participants may view the content item if authorized. In the depicted example, authorized viewer 210 is permitted to access the presented content item, and so may view the data locally during the collaboration session. However, unauthorized viewer 215 is not permitted to access the presented content item, and thus the server hosting the session may not provide the data to the device of unauthorized viewer 215. In various embodiments, an unauthorized viewer may simply not be provided the content, resulting in a blank screen or portion of a screen, or an unauthorized viewer's display may be blurred with respect to any portions that correspond to inaccessible content items. Additionally or alternatively, unauthorized viewers may not receive audio data during the presentation of graphic-based or text-based content items in order to ensure that the unauthorized viewer cannot eavesdrop on the conversation regarding said content items. In some embodiments, unauthorized content may be replaced with an indicator, such as the word "confidential" or an image that indicates that there is content currently being blocked.

Figure 3:
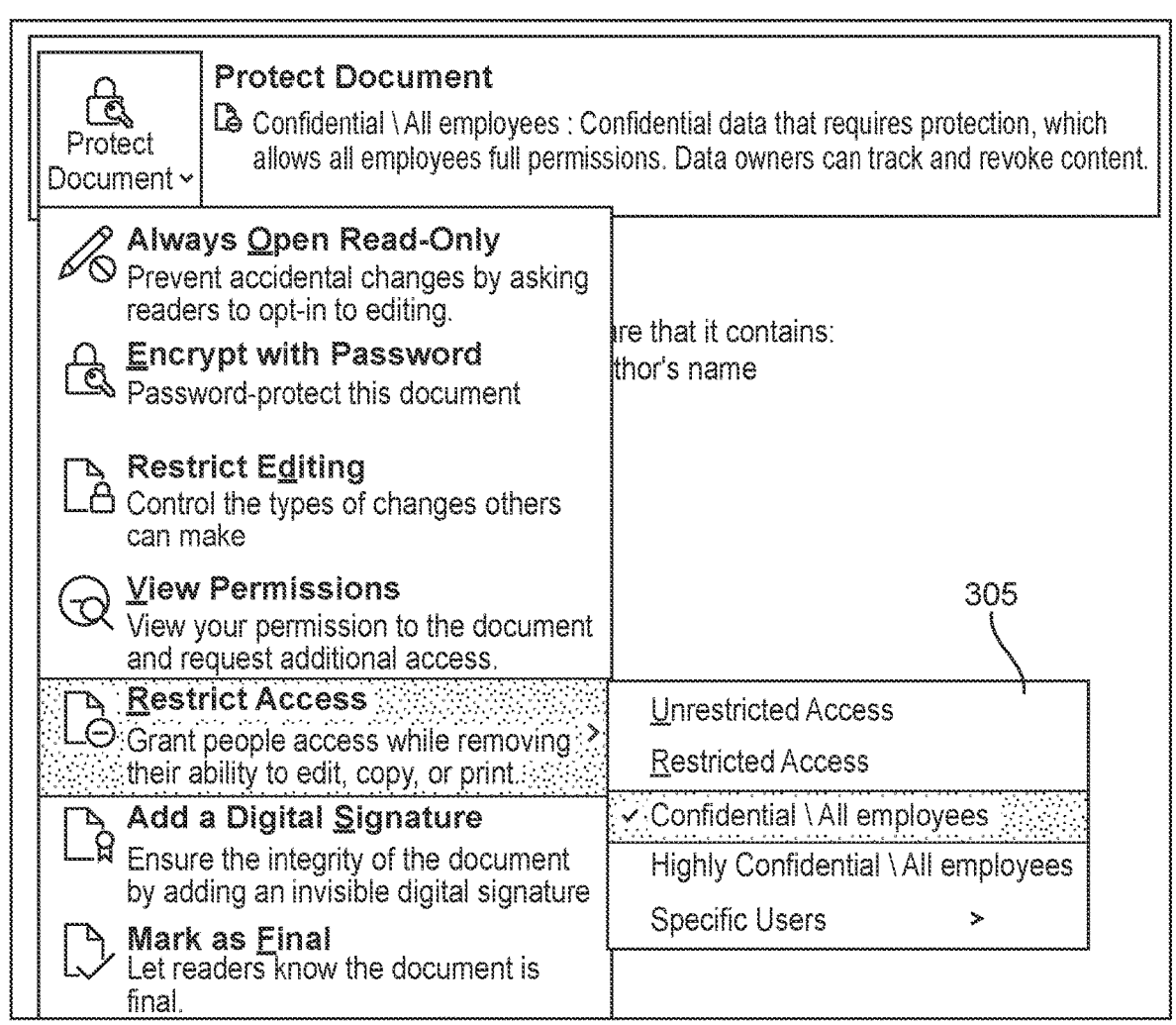
FIG. 3 depicts a user interface for defining a security policy, in accordance with an example embodiment.

FIG. 3 depicts a user interface 300 for defining a security policy, in accordance with an example embodiment. A content author may access user interface 300 during or after creation of content items in a software application, such as a word processor, video editor, image editor, voice recorder, slideshow application, and the like. As depicted, user interface 300 includes a panel 305 in which a user may select options to modify the access conditions for a content item. In the depicted example, the user may select "unrestricted access," "restricted access," "confidential \ all employees," "high confidential \ all employees," and "specific users" to specify individuals that can or cannot access the content item. It should be appreciated that these restriction criteria are an example of some possible access conditions, and that in various embodiments a user may indicate any other restriction criteria, including time-based and/or location-based restrictions. These access conditions may be available to a user by way of a plug-in or extension that is installed in the software application used to author content. When a user provides a security policy for a content item, the software application may communicate with a content control policy server to receive a key that is inserted in the content item, as is depicted and described in further detail with regard to FIGS. 4A and 4B.

Figure 4A:
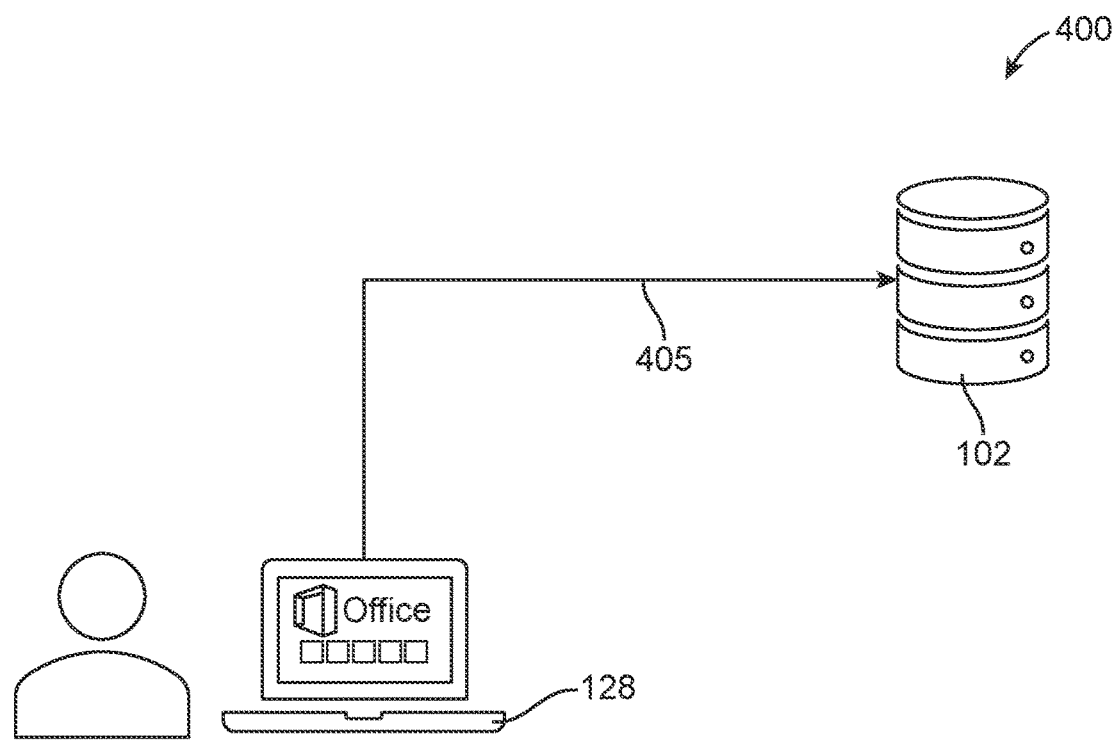
FIGS. 4A and 4B are diagrams depicting a workflow of a user generating a content item and applying a key to the content item, in accordance with an example embodiment.
Figure 4B:
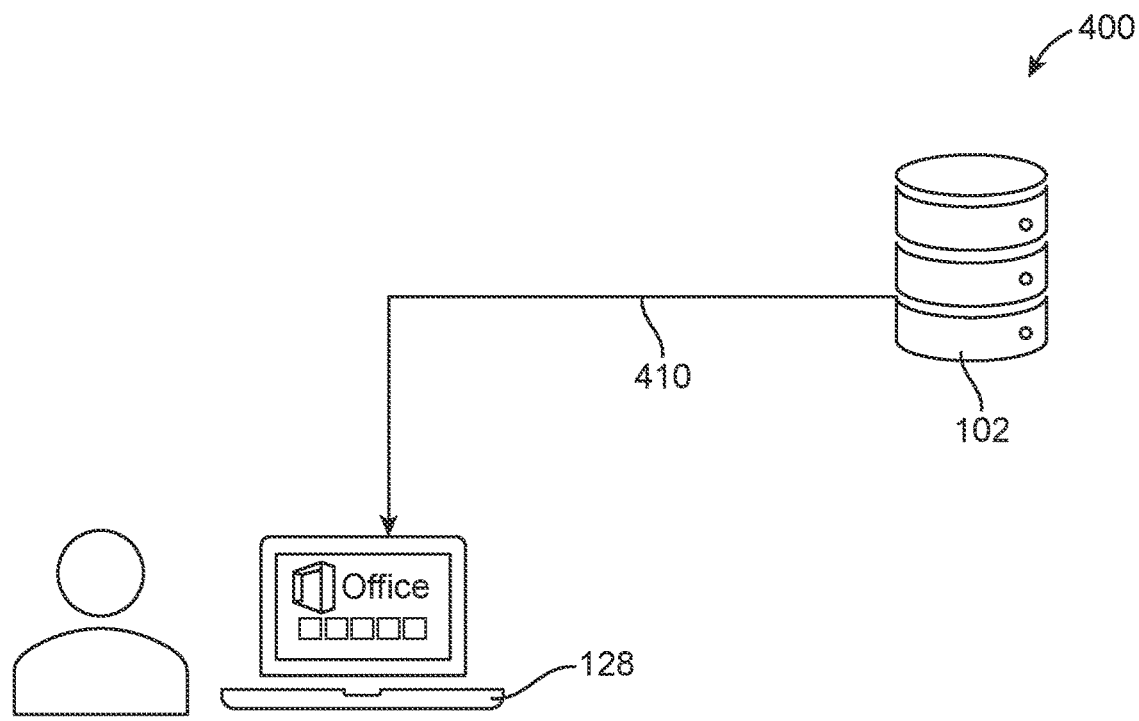

FIGS. 4A and 4B are diagrams depicting a workflow 400 of a user generating a content item and applying a key to the content item, in accordance with an example embodiment. As depicted in FIG. 4A, a content author creates content at endpoint device 128, using a plug-in or other application to input access conditions that describe the security policy for the content item. The access conditions can include an intended audience, any dates when some restrictions may be modified or removed, and any other restrictions. The access conditions are provided to a content control policy server (e.g., content control policy server 102), as indicated by arrow 405.

Continuing now with reference to FIG. 4B, content control policy server (e.g., content control policy server 102) may store the access conditions as a database entry, associate a key with the database entry, and return the key to endpoint device 128, as indicated by arrow 410. The key may be used by a local content control plug-in (e.g., authoring module 138) of endpoint device 128 to generate and insert a two-dimensional barcode into the content item that is machine-detectable but not readily visible to a human eye. In other embodiments, a two-dimensional barcode encoding the key's value may be generated by the content control policy server (e.g., content control policy server 102), and provided to endpoint device 128. In some embodiments, endpoint device may insert a metadata tag including the key's value in another form that is detectable by a server hosting a collaborative communication session. For example, a server hosting a collaborative communication session may inspect the metadata associated with each content item to determine the security policy for each content item. Regardless, the key value may be associated with content item in a manner such that the key value remains associated with the content item in any copies of the content item that are produced or when the content item is inserted or incorporated by reference into another document.

Figure 5:
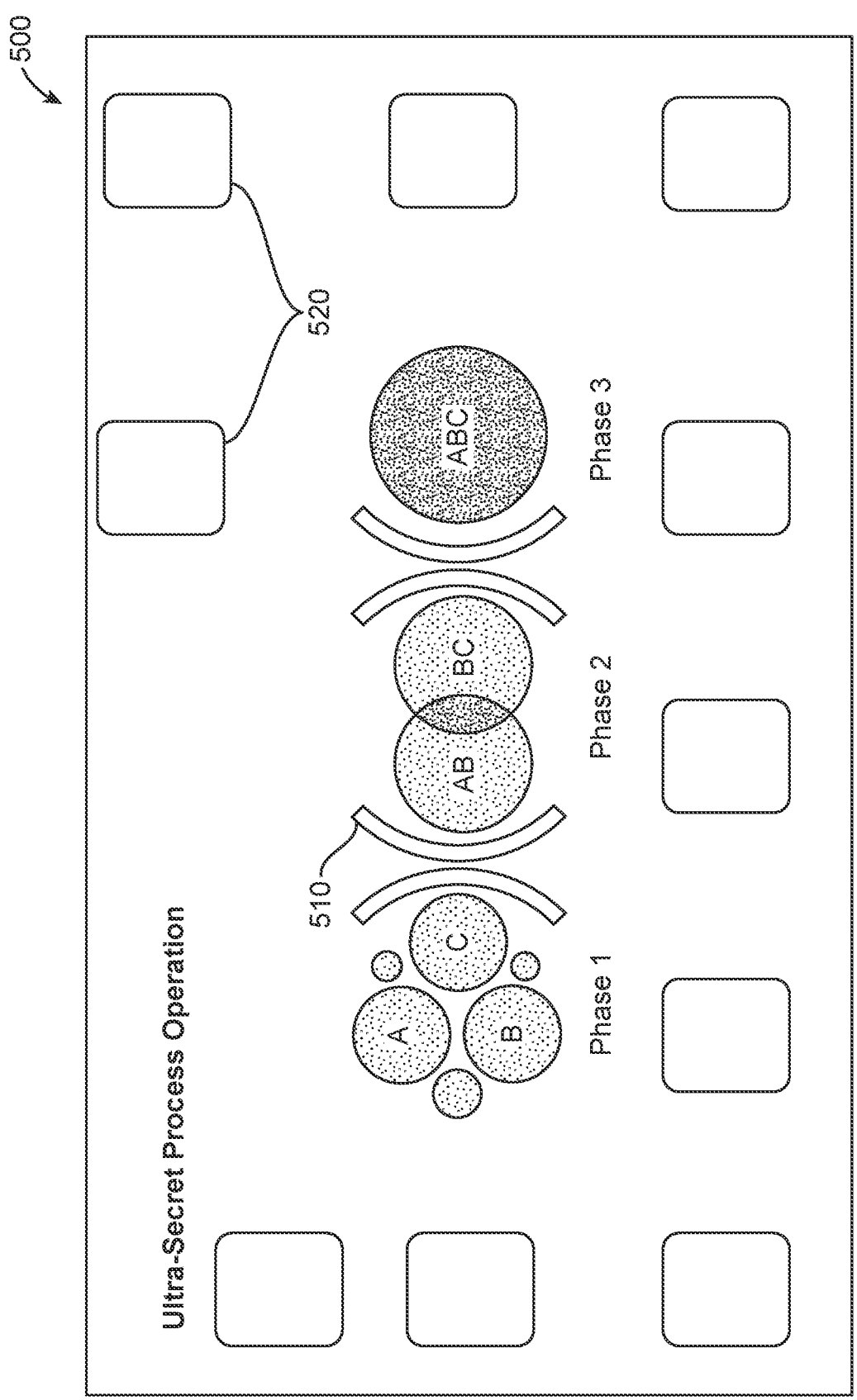
FIG. 5 depicts a view of a user interface including two-dimensional barcode locations, in accordance with an example embodiment.

FIG. 5 depicts a view of a user interface 500 including two-dimensional barcode locations, in accordance with an example embodiment. As depicted, user interface 500 shows an example of a slide of a presentation or page of a document in which a content item 510 is present. As shown by bounding boxes 520, a plurality of two-dimensional barcode locations are indicated. However, each two-dimensional barcode, despite being machine-readable, may not be visually observable by a user due to a transparent quality of each barcode. Accordingly, whenever the content item is shared, either as a file or as a view of a user interface, the two-dimensional barcodes will be included, thus enabling a security policy to be enforced in accordance with present embodiments. In the depicted embodiment, several redundant copies of the barcode are provided so that the key may be retried when even a portion of the current view is observable.

It should be appreciated that multiple content items can be included in a single document in various ways. Content items can correspond to pages of a document, paragraphs of a document, particular in-line images or graphs, slides in a slideshow presentation, particular images, graphs, or other media in a particular slide of a slideshow presentation, and the like. Accordingly, content items are not necessarily document-level items, but can refer to any content at any level of granularity within any document or other data type.

Figure 6A:
FIGS. 6A and 6B depict two-dimensional barcodes, in accordance with example embodiments.
Figure 6B:
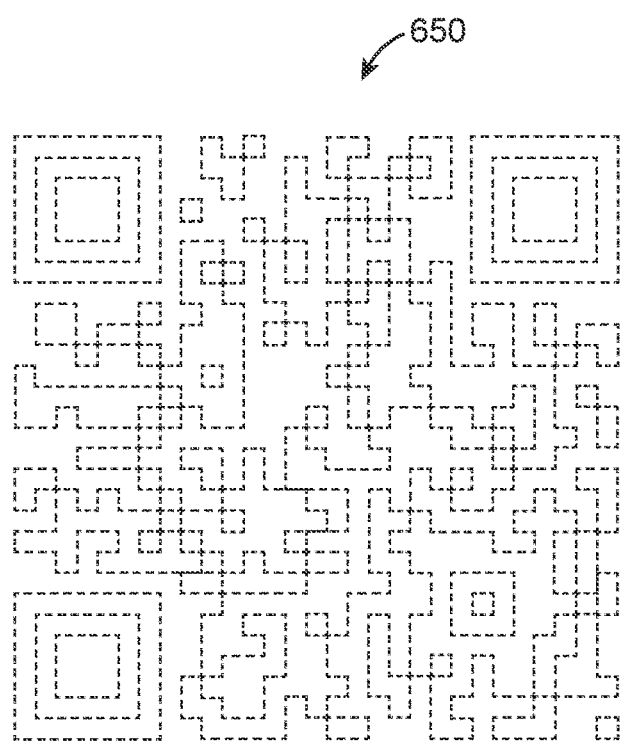

FIGS. 6A and 6B depict two-dimensional barcodes, in accordance with example embodiments. FIG. 6A depicts a two-dimensional barcode 600, which is used to encode a key value that can be used to retrieve a security policy for a content item. The two-dimensional barcode may be a matrix barcode such as a quick response (QR) code or other such format. In various embodiments, other approaches to encoding data visually may be employed, such as a one-dimensional barcode or conventional or other watermarking techniques.

Turning now to FIG. 6B, a barcode 650 is depicted, shown as a blank dotted box to indicate that it has been made sufficiently transparent such that a human eye may not observe the barcode. As depicted, the outline of barcode 650 is shown with dotted lines for clarity; however, it should be understood that the dotted lines would not be included when barcode 650 is inserted into or adjacent to a content item. The pixels of barcode 650 may be a uniform color if inserted into a uniformly-colored portion of a content item, or the pixels may be various colors to blend in with a portion of a content item without being readily visible to a user. However, barcode 650 may be graphically inserted into or adjacent to a content item so that barcode 650 is detectable by image processing techniques.

Figure 7:
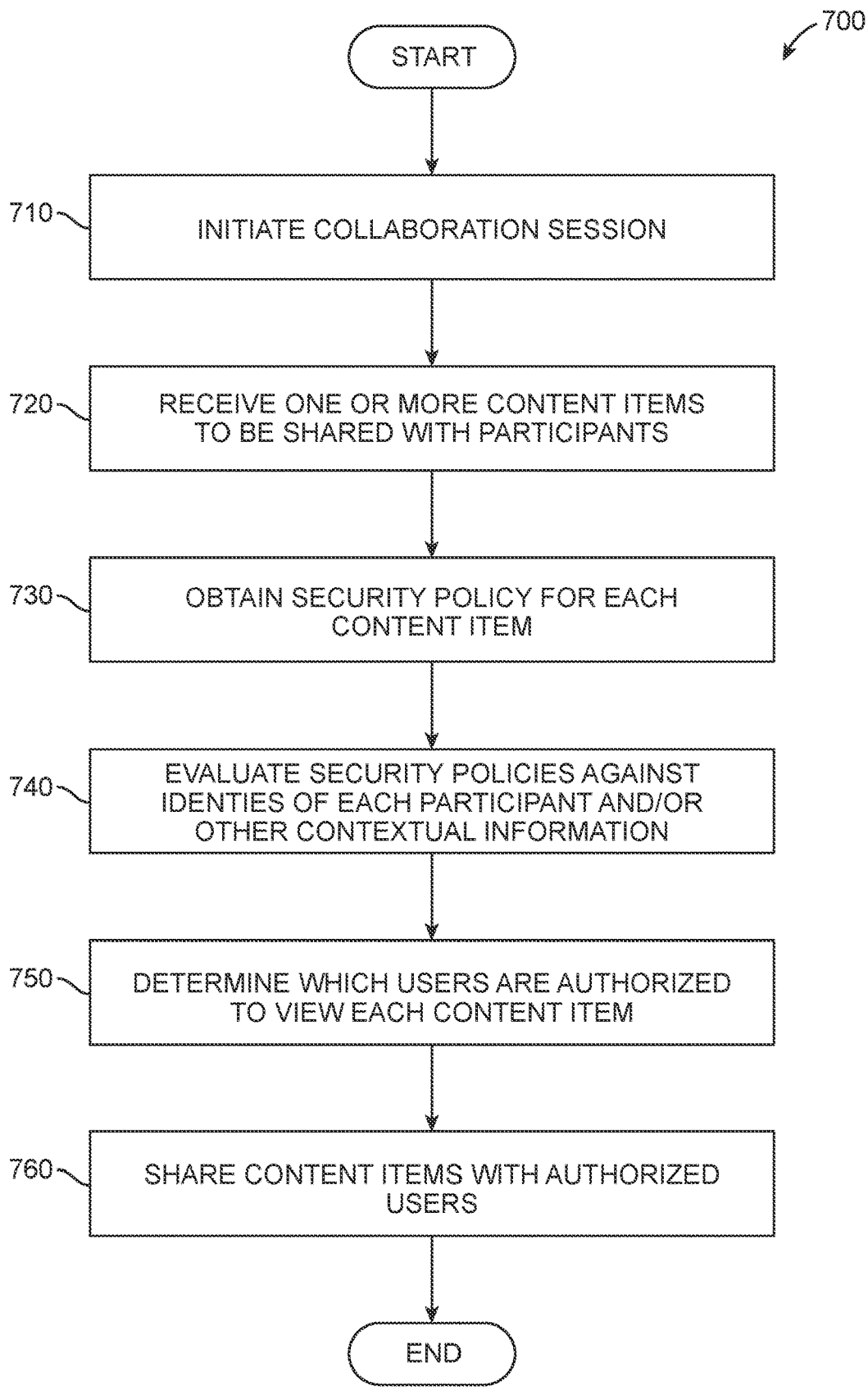
FIG. 7 is a flow chart depicting a method for applying a dynamic security policy to shared content in a collaborative application, in accordance with an example embodiment.

FIG. 7 is a flow chart depicting a method 700 for applying a dynamic security policy to shared content in a collaborative application, in accordance with an example embodiment.

A collaboration session is initiated at operation 710. In various embodiments, the collaboration session may be initiated by a host who invites multiple participants to join, or the session may be automatically initiated at a predetermined time, and the like. The collaboration session can be hosted by a server, such as collaboration session server 118.

One or more content items to be shared in the collaboration session are received at operation 720. A user, such as the host or another user, provides input at their endpoint device to cause the device to request to share one or more content items. The content item(s) can include any text or media, and there may be multiple content items in a single document has been requested to be shared. Initially, the content items may be provided to the server hosting the collaboration session, whereupon the content items can be analyzed further and a security policy applied.

A security policy is obtained for each content item at operation 730. A key may be extracted from each content item, and the key value may be used to retrieve a security policy corresponding to each content item. In some embodiments, the server hosting the communication session extracts the key, and provides the key to another server (e.g., content control policy server 102) to request the security policy. In other embodiments, the server hosting the communication session both extracts the key and performs a local database query to obtain the security policy. The key may include a graphical indicator, such as a watermark or two-dimensional barcode, that is either overlain or inserted adjacent to the content item. The graphical indicator may encode information corresponding to the key value, and may be rendered substantially transparently over or adjacent to a content item so that the graphical indicator is not visible to a user, but is machine-readable (e.g., using image processing techniques).

The security policies for each content item are evaluated against the identities of each participant and/or other contextual information at operation 740. Initially, the access criteria for each content item is obtained based on the value of the key associated with the content item. The access criteria can be evaluated against the identity of each participant in the collaboration session, as well as other contextual information, such as the network location and/or physical location of each participant's endpoint device, the time and/or date, and the like.

Operation 750 determines the users that are authorized to access each content item. Based on evaluating the security policies against the identities of the participants and/or the other contextual information, a subset of users who are authorized to view each content item can be determined. Accordingly, user permissions for each participant can be determined for each content item.

The content items are shared with the authorized users at operation 760. During the collaboration session, content items may be presented by transmitting content items to only the authorized users. For example, a presenting user may navigate through a slideshow presentation, and as the presenting user's view changes to a next one or more content items, those content items will be rendered visible only to the authorized users (e.g., the data corresponding to those content items will not be transmitted to the endpoint devices of any unauthorized users).

Figure 8:
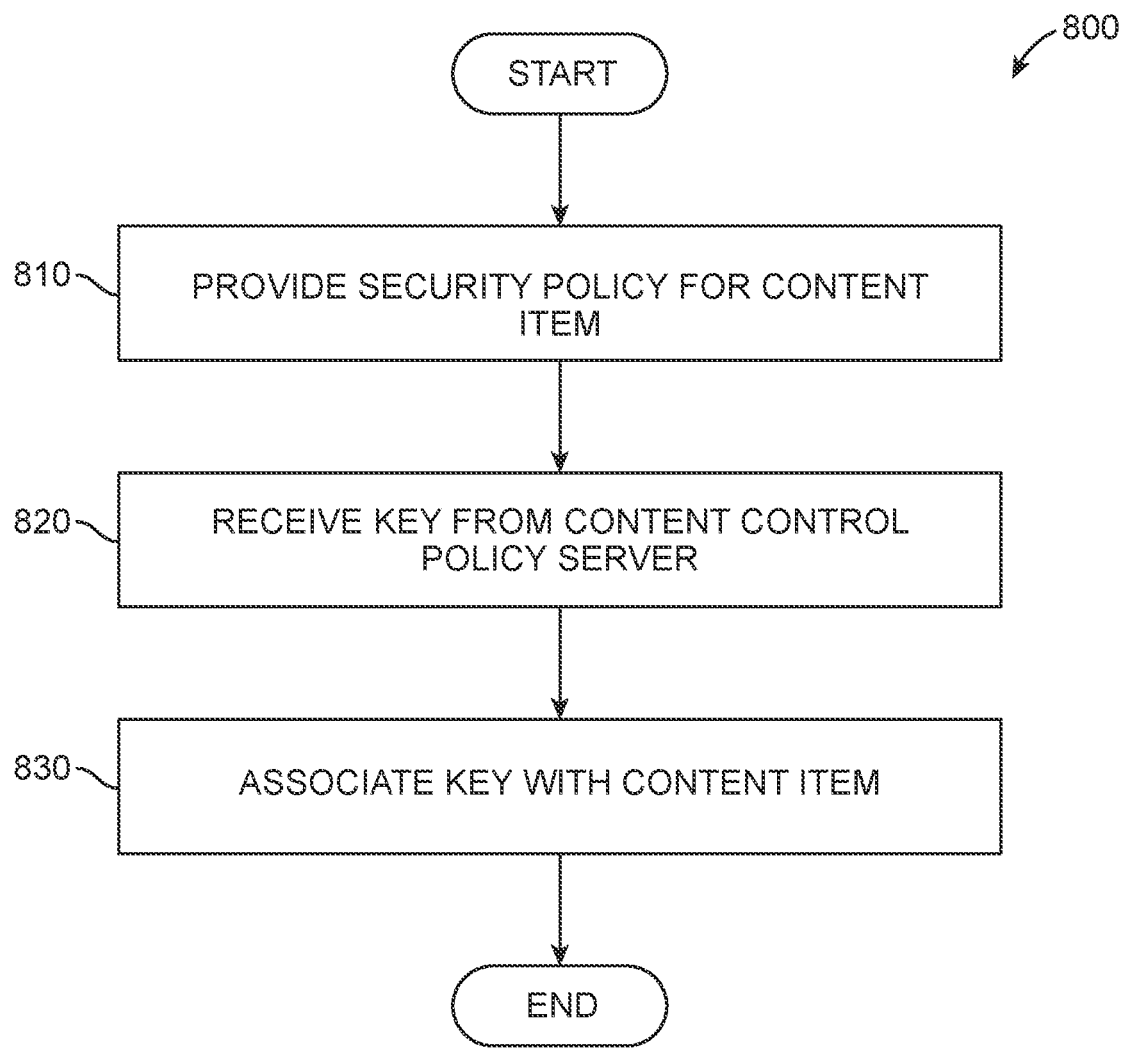
FIG. 8 is a flow chart depicting a method for associating a security policy with a content item, in accordance with an example embodiment.

FIG. 8 is a flow chart depicting a method 800 for associating a security policy with a content item, in accordance with an example embodiment.

A security policy is provided for a content item at operation 810. Initially, an author creates a content item, which can include any text-based and/or media-based items. As non-limiting examples, content items may include a word or phrase, a paragraph of text, an image, a graph, a video and/or audio sample, an executable set of program instructions, a hypertext markup language (HTML) file, an email, and the like.

After the author creates the content item, the author may input a selection of information to define a security policy for the content item. For example, the author may provide a selection of users or user groups who can or cannot access the content item, or the user may provide context-based restrictions, such as physical locations or network locations of endpoint devices, or the user may provide time-based restrictions. In some embodiments, the author may place a time-based expiration on one or more restrictions such that the restrictions are lifted upon expiry of the time duration. The author may define the security policy by interacting with a plug-in to a content authoring application, and the plug-in may transmit the security policy to a content control policy server.

A key is received from a content control policy server at operation 820. The content control policy server receives the security policy, stores the security policy, and associates a key with the security policy. The value of the key may accordingly be used to retrieve the security policy details from a database managed by the content control policy server. The key may be returned to the endpoint device of the content author, either in the form of data indicating the key value, or a graphical indicator encoding the key value.

The key is associated with the content item at operation 830. A graphical indicator encoding the key value may be inserted over or adjacent to the content item, thereby associating the content item with the key. If a graphical indicator is not received, then the endpoint device of the content author may generate a graphical indicator that encodes the key value. Alternatively, in some embodiments the key value may be stored as metadata that is associated with the content item. Accordingly, whenever the content item is transmitted, copied, or presented visually, the key may be obtained from the content item and a security policy for the content item can be determined. Further, when an author or other user subsequently modifies the security policy stored at the content control policy server, the security policy is automatically thereafter applied to each existing copy of the content item, including copies used in other documents, etc.

Figure 9:
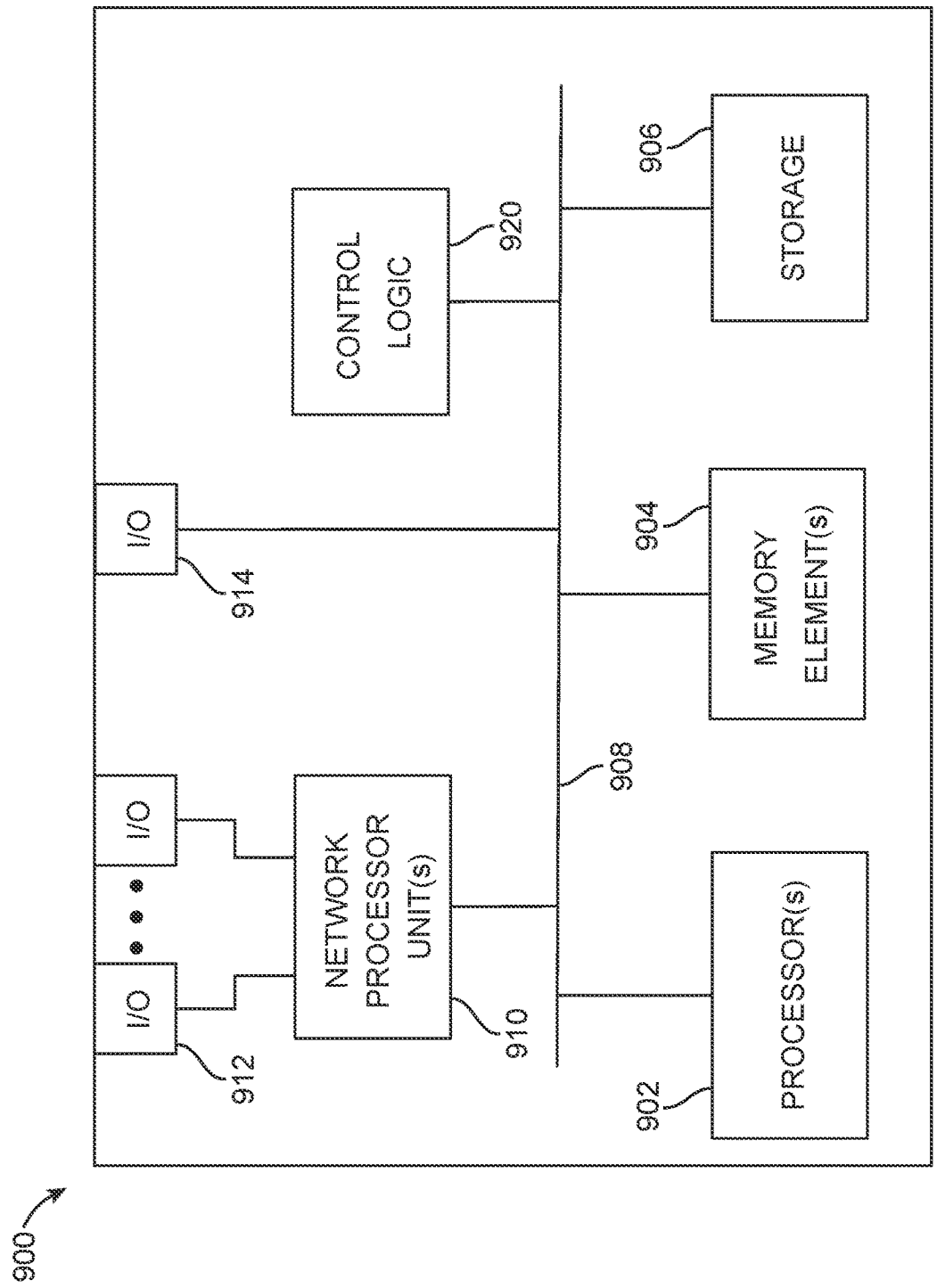
FIG. 9 is a block diagram depicting a computing device configured to apply a dynamic security policy, in accordance with an example embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device, such as computing device 900 or any combination of computing devices 900, may be configured as any entity/entities as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 902.11 (e.g., Wi-Fi®/Wi-Fi6®), IEEE 902.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: receiving a selection of one or more content items for sharing in a communication session, querying a security policy using a key that is associated with each of the one or more content items to determine a security policy for each of the one or more content items, identifying a plurality of users participating in the communication session, and selectively presenting each content item of the one or more content items to a subset of the plurality of users based on an identity of a respective user and the security policy of each content item.

In another form, selectively presenting is further based on a time of the communication session, and a location of each user.

In another form, the key includes a two-dimensional barcode that is detected via image processing.

In another form, the key for a particular content item remains associated with the particular content item when the particular content item is copied or inserted into another document.

In another form, the security policy for a particular content item is modified, which results in changing access conditions to the particular content item for all copies of the particular content item.

In another form, information for the security policy for a particular content item is stored based on input from an author of the particular content item, wherein the information for the security policy defines one or more attributes for the security policy of the particular content item. In a further form, the input is received via a plug-in to content authoring software used to author the particular content item.

In another form, the security policy indicates a point in time at which one or more attributes of the security policy are automatically modified.

In one form, a computer system is provided, comprising: one or more computer processors; one or more computer readable storage media; and program instructions stored on the one or more computer readable storage media for execution by at least one of the one or more computer processors, the program instructions comprising instructions to: receive a selection of one or more content items for sharing in a communication session, query a security policy using a key that is associated with each of the one or more content items to determine a security policy for each of the one or more content items, identify a plurality of users participating in the communication session, and selectively present each content item of the one or more content items to a subset of the plurality of users based on an identity of a respective user and the security policy of each content item.

In one form, one or more computer readable storage media is provided, the one or more computer readable storage media collectively having program instructions embodied therewith, the program instructions executable by a computer to cause the computer to: receive a selection of one or more content items for sharing in a communication session, query a security policy using a key that is associated with each of the one or more content items to determine a security policy for each of the one or more content items, identify a plurality of users participating in the communication session, and selectively present each content item of the one or more content items to a subset of the plurality of users based on an identity of a respective user and the security policy of each content item.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a selection of one or more content items for sharing in a communication session;
   querying a security policy using a key that is associated with each of the one or more content items to determine the security policy for each of the one or more content items;
   identifying a plurality of users participating in the communication session; and
   selectively presenting each content item of the one or more content items to a subset of the plurality of users based on an identity of a respective user and the security policy of each content item, wherein a particular user who is unauthorized to view the one or more content items is presented with a different view than a view presented to the subset of the plurality of users during a portion of the communication session in which the one or more content items are presented to the subset of the plurality of users.

2. The computer-implemented method of claim 1, wherein selectively presenting is further based on a time of the communication session, and a location of each user.

3. The computer-implemented method of claim 1, wherein the key includes a two-dimensional barcode that is detected via image processing.

4. The computer-implemented method of claim 1, wherein the key for a particular content item remains associated with the particular content item when the particular content item is copied or inserted into another document.

5. The computer-implemented method of claim 1, further comprising modifying the security policy for a particular content item, which results in changing access conditions to the particular content item for all copies of the particular content item.

6. The computer-implemented method of claim 1, further comprising storing information for the security policy for a particular content item based on input from an author of the particular content item, wherein the information for the security policy defines one or more attributes for the security policy of the particular content item.

7. The computer-implemented method of claim 6, wherein the input is received via a plug-in to content authoring software used to author the particular content item.

8. The computer-implemented method of claim 1, wherein the security policy indicates a point in time at which one or more attributes of the security policy are automatically modified.

9. An apparatus comprising:
one or more computer processors;
a network interface configured to enable network communications;
one or more computer readable storage media; and
program instructions stored on the one or more computer readable storage media for execution by at least one of the one or more computer processors, the program instructions comprising instructions to:
receive a selection of one or more content items for sharing in a communication session;
query a security policy using a key that is associated with each of the one or more content items to determine the security policy for each of the one or more content items;
identify a plurality of users participating in the communication session; and
selectively present each content item of the one or more content items to a subset of the plurality of users based on an identity of a respective user and the security policy of each content item, wherein a particular user who is unauthorized to view the one or more content items is not provided with audio data from the subset of the plurality of users during a portion of the communication session in which the one or more content items are presented.

10. The apparatus of claim 9, wherein selectively presenting is further based on a time of the communication session, and a location of each user.

11. The apparatus of claim 9, wherein the key includes a two-dimensional barcode that is detected via image processing.

12. The apparatus of claim 9, wherein the key for a particular content item remains associated with the particular content item when the particular content item is copied or inserted into another document.

13. The apparatus of claim 9, wherein the program instructions further comprise instructions to:
modify the security policy for a particular content item, which results in changing access conditions to the particular content item for all copies of the particular content item.

14. The apparatus of claim 9, further comprising instructions to store information for the security policy for a particular content item based on input from an author of the particular content item, wherein the information for the security policy defines one or more attributes for the security policy of the particular content item.

15. The apparatus of claim 14, wherein the input is received via a plug-in to content authoring software used to author the particular content item.

16. The apparatus of claim 9, wherein the security policy indicates a point in time at which one or more attributes of the security policy are automatically modified.

17. One or more non-transitory computer readable storage media collectively having program instructions embodied therewith, the program instructions executable by a computer to cause the computer to:
receive a selection of one or more content items for sharing in a communication session;
query a security policy using a key that is associated with each of the one or more content items to determine the security policy for each of the one or more content items;
identify a plurality of users participating in the communication session; and
selectively present each content item of the one or more content items to a subset of the plurality of users based on an identity of a respective user and the security policy of each content item, wherein a particular user who is unauthorized to view the one or more content items is presented with a different view than a view presented to the subset of the plurality of users during a portion of the communication session in which the one or more content items are presented to the subset of the plurality of users.

18. The one or more non-transitory computer readable storage media of claim 17, wherein selectively presenting is further based on a time of the communication session, and a location of each user.

19. The one or more non-transitory computer readable storage media of claim 17, wherein the key includes a two-dimensional barcode that is detected via image processing.

20. The one or more non-transitory computer readable storage media of claim 17, wherein the key for a particular content item remains associated with the particular content item when the particular content item is copied or inserted into another document.

* * * * *